(12) United States Patent
Kirshenbaum

(10) Patent No.: US 9,152,475 B1
(45) Date of Patent: Oct. 6, 2015

(54) NOTIFYING LISTENERS OF CHANGE EVENTS

(75) Inventor: Evan R. Kirshenbaum, Mountain View, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 2300 days.

(21) Appl. No.: 11/239,719

(22) Filed: Sep. 29, 2005

(51) Int. Cl.
*G06F 9/54* (2006.01)

(52) U.S. Cl.
CPC ........................................ *G06F 9/54* (2013.01)

(58) Field of Classification Search
None
See application file for complete search history.

(56) References Cited

U.S. PATENT DOCUMENTS

| | | | |
|---|---|---|---|
| 6,829,771 B1 | 12/2004 | Bahrs et al. | |
| 2001/0010056 A1* | 7/2001 | Nishigaya et al. | 709/202 |
| 2001/0054072 A1* | 12/2001 | Discolo et al. | 709/206 |
| 2003/0028682 A1* | 2/2003 | Sutherland | 709/315 |
| 2003/0115375 A1* | 6/2003 | Robison | 709/318 |
| 2004/0003122 A1* | 1/2004 | Melillo | 709/246 |
| 2004/0064530 A1 | 4/2004 | Sinclair et al. | |
| 2004/0177319 A1* | 9/2004 | Horn | 715/501.1 |
| 2004/0230973 A1* | 11/2004 | Cundiff et al. | 718/1 |
| 2005/0114487 A1* | 5/2005 | Peng et al. | 709/223 |
| 2005/0262101 A1* | 11/2005 | Halpern et al. | 707/10 |
| 2006/0123427 A1* | 6/2006 | Harold et al. | 719/318 |

OTHER PUBLICATIONS

Annotated Outline of Collections Framework, Sun Microsystems, Inc, 1995-1999, pp. 1-3.*

* cited by examiner

*Primary Examiner* — Tuan Dao
(74) *Attorney, Agent, or Firm* — Trop, Pruner & Hu, P.C.

(57) ABSTRACT

Plural change events are associated with corresponding listeners, where the plural change events represent distinct groups of one or more changes made to a collection of items. In response to a further change of the collection of items, the plural change events are modified to include the further change. The listeners are notified of respective plural change events.

24 Claims, 7 Drawing Sheets

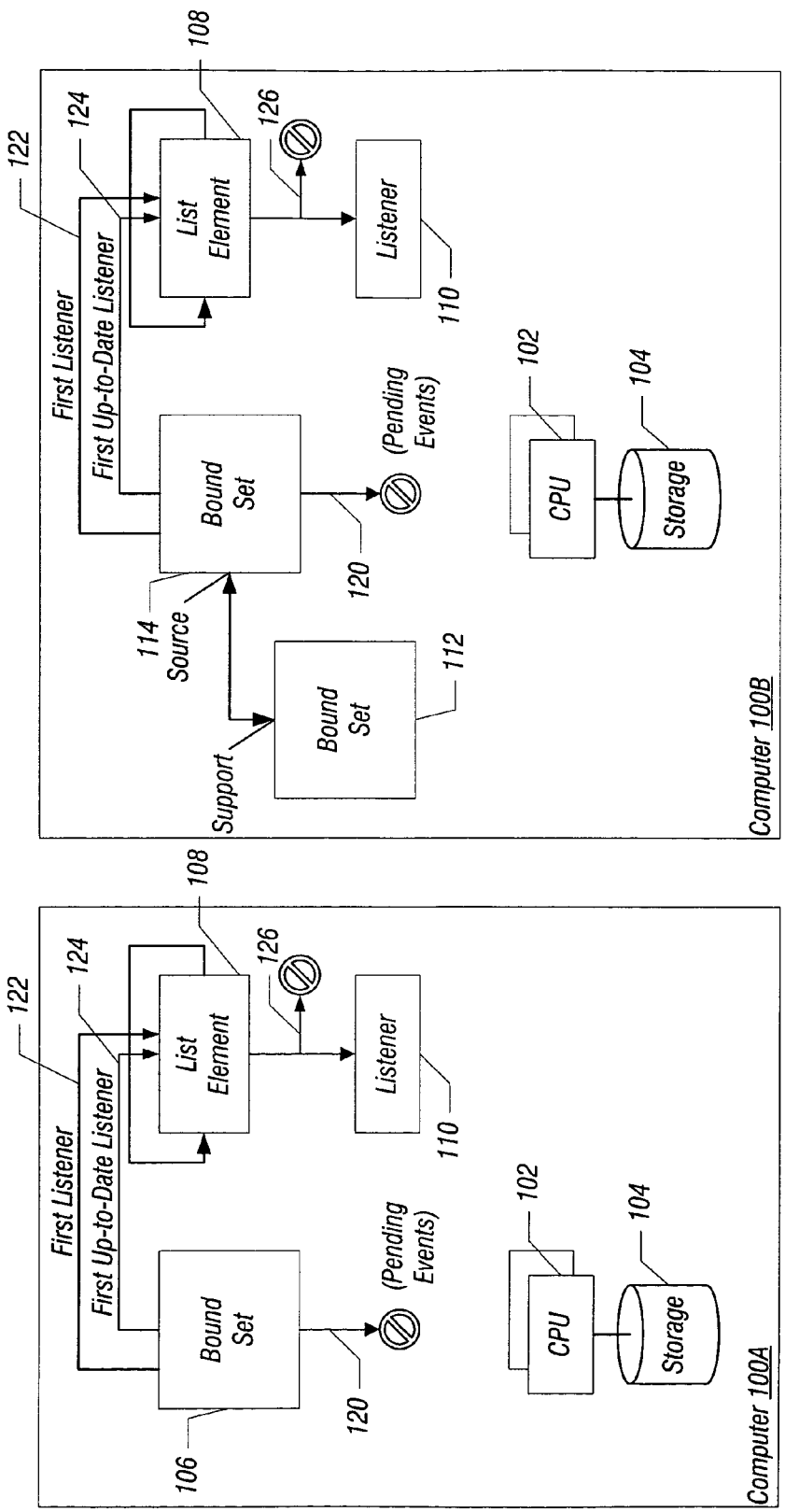

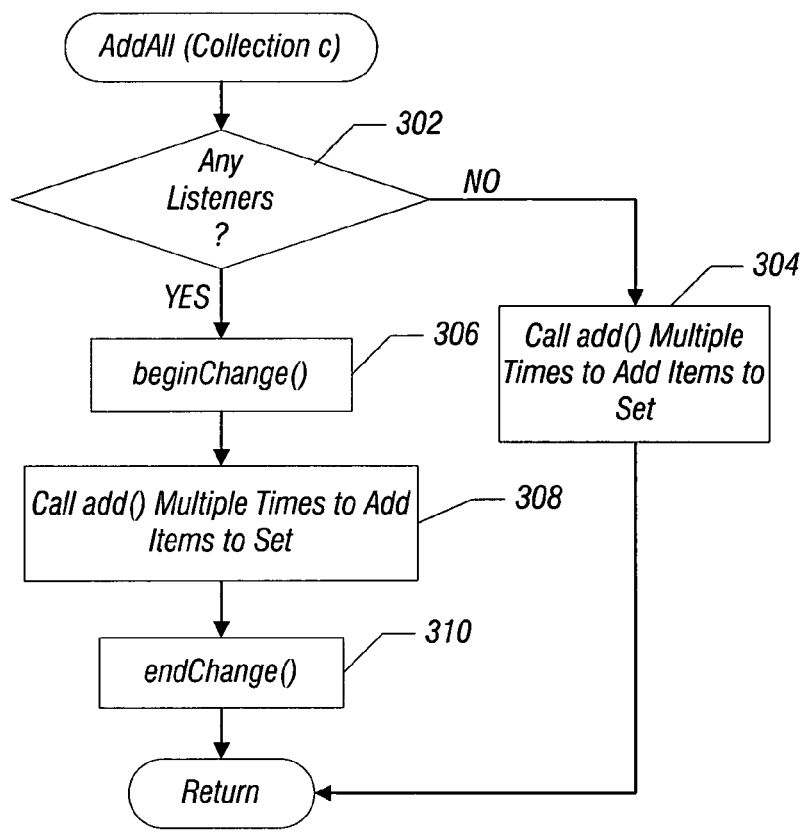
FIG. 3
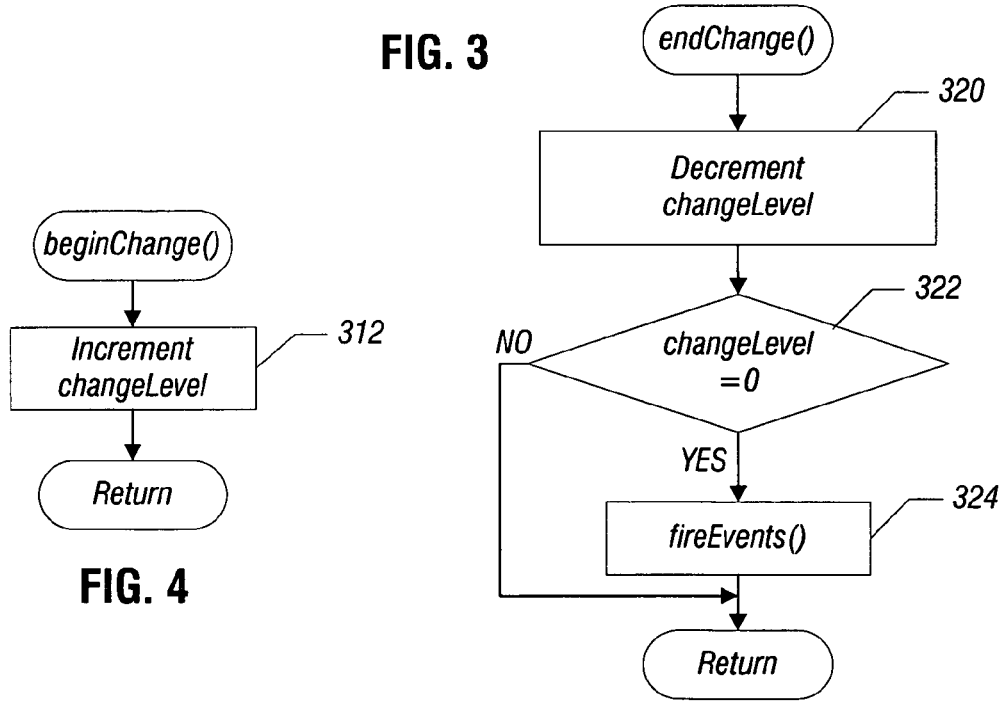
FIG. 4
FIG. 5

ITERATION 1:

FIRST UP-TO-DATE LISTENER IS NULL;
X IS FIRST LISTENER
(1) p ← X
(2) FIRST LISTENER ← Y
   FIRST UP-TO-DATE LISTENER ← X
(3) e ← E1
(4) E1 IS FIRST, SO DO NOT REMOVE
(5) X'S EVENT ← NULL
(6) NOT UP-TO-DATE, BUT Y's EVENT IS NOT NULL; DO NOTHING
(7) PROCESS E1 BECAUSE WORTH RAISING

ITERATION 2:

X IS FIRST UP-TO-DATE LISTENER;
Y IS FIRST LISTENER
(1) p ← Y
(2) FIRST LISTENER ← Z
   FIRST UP-TO-DATE LISTENER REMAINS X
(3) e ← E2
(4) E2 IS NOT FIRST, SO REMOVE E1
(5) Y'S EVENT ← NULL
(6) NOT UP-TO-DATE, AND Z'S EVENT IS NULL; SET LISTENER Z'S EVENT TO E2
(7) PROCESS E2 BECAUSE WORTH RAISING

IN STEP (7), ITEM C REMOVED FROM BOUND SET, WHICH CAUSES:
   -CREATE E3 ASSOCIATED WITH X
   -SET FIRST UP-TO-DATE LISTENER TO NULL
   -REMOVE C FROM E2 { }
   -CALL fireEvents( )

ITERATION 1 (NESTED LEVEL):

FIRST UP-TO-DATE LISTENER IS NULL;
Z IS FIRST LISTENER
(1) p ← Z
(2) FIRST LISTENER ← X
   FIRST UP-TO-DATE LISTENER ← Z
(3) e ← E2
(4) E2 IS FIRST, SO DO NOT REMOVE
(5) Z'S EVENT ← NULL

ITERATION 1 (NESTED LEVEL) cont'd (6) NOT UP-TO-DATE, BUT X'S EVENT IS NOT NULL; DO NOTHING
(7) DO NOT PROCESS E2 BECAUSE NOT WORTH RAISING

ITERATION 2 (NESTED LEVEL):

Z IS FIRST UP-TO-DATE LISTENER;
X IS FIRST LISTENER
(1) p ← X
(2) FIRST LISTENER ← Y
   FIRST UP-TO-DATE LISTENER REMAINS Z
(3) e ← E3
(4) E3 IS NOT FIRST, SO REMOVE E2
(5) X'S EVENT ← NULL
(6) NOT UP-TO-DATE, AND Y's EVENT IS NULL; SET Y'S EVENT TO E3
(7) PROCESS E3 BECAUSE WORTH RAISING

ITERATION 3 (NESTED LEVEL):

Z IS FIRST UP-TO-DATE LISTENER;
Y IS FIRST LISTENER
(1) p ← Y
(2) FIRST LISTENER ← Z
   FIRST UP-TO-DATE LISTENER REMAINS Z
(3) e ← E3
(4) E3 IS FIRST, SO DO NOT REMOVE
(5) Y'S EVENT ← NULL
(6) UP-TO-DATE
(7) PROCESS E3 BECAUSE WORTH RAISING

EXIT LOOP

FIG. 9

NOTIFYING LISTENERS OF CHANGE EVENTS

BACKGROUND

A useful programming paradigm is often referred as "reactive programming" or "event-driven programming". In this paradigm, an object registers event handlers (which are software routines) that are invoked in response to predetermined events. For example, a software module may wish to be notified of a change to the value of a particular variable. To do so, the software module can register a handler so that upon a change to the particular variable, the handler is informed about the change. Multiple event handlers can be registered by the software module (or by plural software modules) to monitor changes to the particular variable (or to monitor other events).

Generally, the reactive programming or event-driven programming paradigm works well for software modules that transition from one mode or state to another mode or state in response to external events or to changes made to atomic variables (such as numbers or Boolean values). However, conventional systems do not efficiently handle events that represent changes to a collection of items.

For example, in the JavaBeans model, a collection of items can be represented as a bound property of an object and associated with one or more listeners. When a change occurs to a bound property, registered listeners are notified by means of an event that identifies the object whose property changed, the name of the property that changed, and the old and new values of the property. There are several conventional approaches to providing event objects for changes in bound properties that represent collections. In a first conventional approach, when a collection is modified by adding or deleting values, both the new value and old value referenced by the event point to the same collection object. In this first approach, a listener has no way of knowing what change has just occurred in the collection.

In a second conventional approach, a collection is copied before the change occurs, and both the old value and new value are passed to a listener. However, in this second approach, unnecessary copying is performed, which is wasteful of processing and storage resources of a system. Also, if the old value referenced by the event is the identical object as the collection prior to the change, any prior references to the collection previously acquired by any software module will no longer refer to the current value.

With either the first or second approach, the decision to propagate an event is made outside the collection object itself, which may be difficult to handle because external code has to be written to make the decision for propagating an event representing a change to the collection. Also, conventionally, any modification to the collection would have to be made through the application programming interface (API) of a containing object of the collection, since any changes made directly to the collection will not be propagated.

Moreover, conventional event propagation mechanisms do not handle multiple changes to a collection efficiently. If there are multiple changes to a collection, each listener will be called multiple times. For example, if item A is added to a collection and item B is added to the collection, then a listener would be called twice for the two changes to the collection. Even worse, if item A is added to a collection, and item A is later removed from the collection, then a listener would also be called twice for the two change events, even though the two changes effectively cancel each other out such that the collection has not actually been changed.

Conventional event propagation mechanisms also do not handle nested changes to a collection very efficiently. For example, if a first change (such as the addition of item A) is made to a collection, a list of listeners is called to notify the listeners of the change. Typically, these listeners will be called sequentially. However, in some cases, one of the listeners may actually make a further change to the collection (e.g., addition of item B to the collection), which may then cause a second round of calls to the list of listeners interested in changes to the collection. In many common implementations the two (or more) events received by a listener in such situations may be received out of order (e.g., receiving notification of the addition of item B before receiving notification of the addition of item A) and/or may lead it to infer that the collection results in the same final state following each received event.

BRIEF DESCRIPTION OF THE DRAWINGS

Some embodiments of the invention are described with reference to the following figures:

FIGS. 1A-1B are block diagrams of some embodiments of the invention;

FIG. 3 is a flow diagram of a process performed by a software method for adding objects to a set, in accordance with an embodiment;

FIG. 4 is a flow diagram of a process performed by a software method for beginning a change of a set, according to an embodiment;

FIG. 5 is a flow diagram of a process performed by a software method for ending a change of a set, according to an embodiment;

FIG. 9 illustrates a number of iterations performed by the software method of FIG. 8, in accordance with an embodiment.

DETAILED DESCRIPTION

Figure 2A:
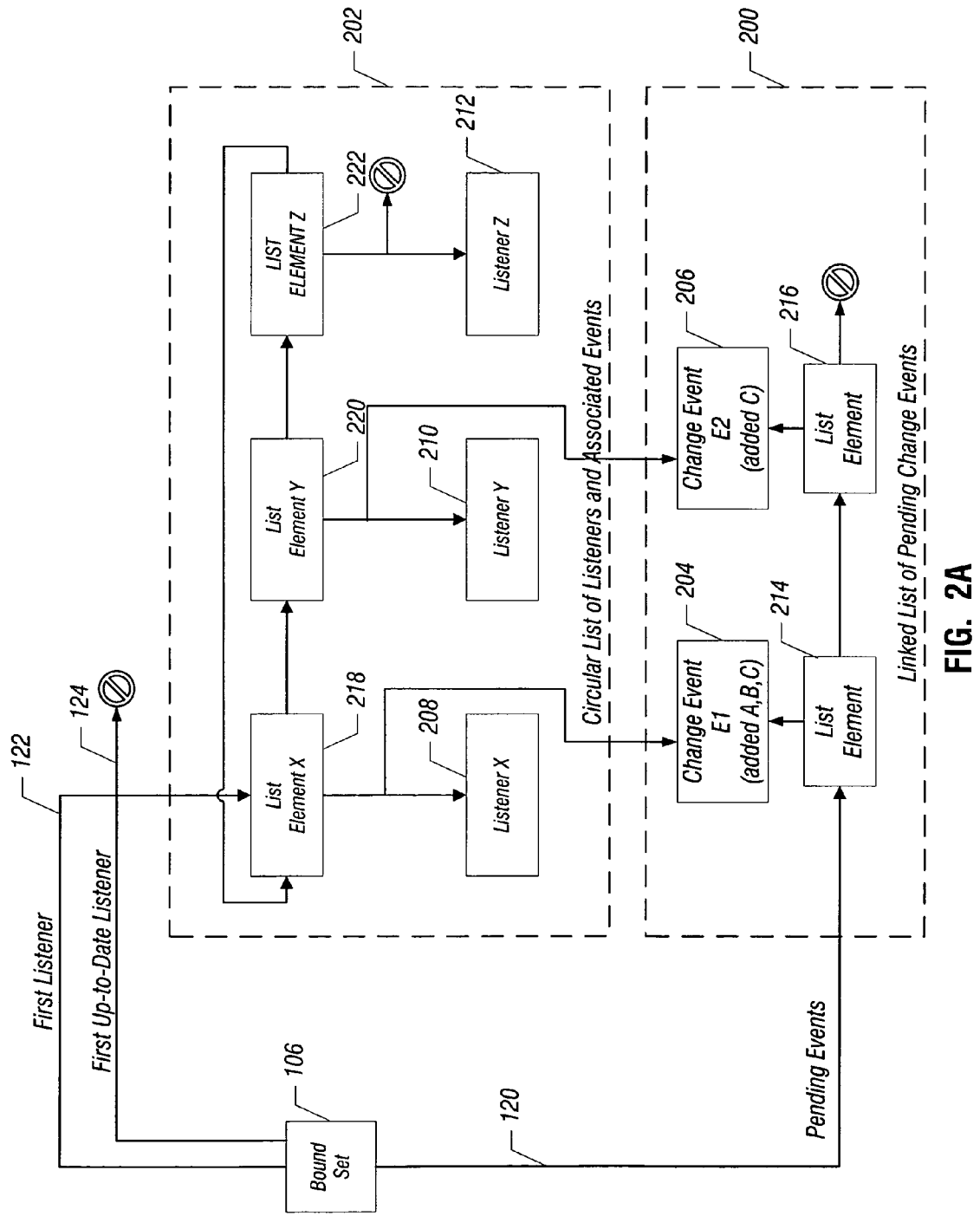
FIGS. 2A-2B are block diagrams illustrating example arrangements of a bound set, a circular linked list of listeners and associated events, and a linked list of pending change events, in accordance with an embodiment.

FIGS. 1A-1B illustrate two embodiments of systems that provide change events in response to changes made to a "collection" of items. FIG. 1A shows a computer 100A that contains portions of the system according to one embodiment, while FIG. 1B shows a computer 100B that contains portions of a system according to another embodiment. As used here, the term "collection of items" or "collection" refers to sets, lists, trees, maps, and other data structures that provide some grouping of items.

In the ensuing discussion, reference is made to sets, and in particular, to bound sets. A "bound set" refers to a set of items that are associated with one or more listeners that are interested in changes made to the set. More generally, a "bound collection" refers to a collection (e.g., a set, a multiset, a list, a vector, a map, a multimap, an array, a tree, a graph, etc.) of items that may be associated with one or more listeners interested in changes made to the collection. References to bound sets should be construed as pertaining to other types of bound collections, with the details of the event objects described below altered in the appropriate manner to the particular types of modifications that can be made to other types of collections. In the ensuing discussion, the term "set" also refers to a "bound set."

A change or a group of changes made to a bound set is communicated to the listeners in change event objects, where each change event object represents a group of one or more changes made to the bound set. A "listener" refers to an object, function, routine, procedure, or other type of component that is created for the purpose of monitoring change event objects representing changes to a bound set. Note that the term "listener" is not intended to imply that any particular programming language is used for implementing some embodiments. A listener can be associated with some software module in the system, such as application software, operating system software, or any other type of software. In fact, a listener can also be associated with another bound set (so that changes in one bound set can be communicated to another bound set).

A change event object (also referred to as a "change event") is an object that contains a representation of a change (or a group of changes) made to the bound set. Stated differently, when a bound set changes its value, the bound set propagates to its listeners a change event that contains a representation of the change. The change event is propagated to listeners that are registered (referred to as "registered listeners"). A listener can be un-registered, in which case, a change event is not propagated to the un-registered listener.

Changes that can be made to a set include addition of items or objects, removal of items or objects, and clearing of items or objects from an entire set. Note that the terms "item" and "object" are used interchangeably. In the ensuing discussion, reference is made to adding, removing, or clearing items or objects from a set. For bound versions of collections other than sets, the changes represented by change event objects include other modifications appropriate to the semantics of the collection. Such changes might include the following: for ordered collections such as lists, changes to the ordering of elements; for associative collections such as maps or tables, changes in the association between keys and values; and for structured collections such as graphs or trees, changes in the structural relationships between the items contained in the collection.

As depicted in FIG. 1A, the computer 100A includes a bound set 106 and a listener 110 that is registered to receive change events representing changes made to the bound set 106. Note that multiple listeners 110 can be registered for the bound set 106. Also, there can be a plurality of bound sets 106 with associated groups of one or more listeners 110. It is also possible that a bound set is not associated with any listeners.

In the state depicted in FIG. 1A, there are no pending events for the bound set 106 (in other words, no changes have been made to the bound set since the last time the listener 110 was updated). As shown in FIG. 1A, the bound set 106 points (at 120) to null (0), which means that no pending events exist for the bound set 106. Also shown in FIG. 1A is a First Listener pointer 122 that points to the registered listener (the first listener) that has been on the list the longest since the listener was added or last invoked. Another pointer 124 from the bound set 106 is a First Up-to-Date Listener pointer that points to the oldest listener for which the bound set 106 has not changed since the oldest listener was added or last invoked.

Effectively, the First Listener pointer 122 and First Up-to-Date Listener pointer 126 are tracking pointers that enable a mechanism according to some embodiments to track which listeners are up to date and which listeners remain to be updated with one or more change events. Both the First Listener pointer 114 and First Up-to-Date Listener pointer 116 are initially set to a null value. If both the First Listener and First Up-to-Date Listener pointers point to the same listener, then that is an indication that all listeners are up to date. The First Listener and First Up-to-Date Listener pointers 122 and 124 point to one or more list elements 108 that are associated with respective one or more listeners 110. A list element 108 is an element of a list of listeners, described further below.

The bound set 106 includes an interface that is associated with various software methods that can be called to perform various tasks according to some embodiments (e.g., register a listener, un-register a listener, check if a listener is associated with a bound set, begin change, end change, etc.). A "software method" refers to a software routine or module that is invocable to perform a predefined task. In the ensuing discussion, "software methods" are simply referred to as "methods." Also associated with the bound set 106 are various methods for querying the state and contents of the bound set 106 as a set and, optionally, adding an object to a bound set, removing an object from a bound set, and clearing a bound set.

Software in the computer 100A, including methods and objects associated with the bound set 106, listeners 110, and other software, are executable on one or more central processing units (CPUs) 102, which is (are) coupled to storage 104 for storing data (including data structures associated with the bound set 106, various lists, collections, and other data structures). The storage 104 includes persistent storage (e.g., disk drives, non-volatile memory, etc.), and non-persistent storage (e.g., dynamic random access memories, static random access memories, etc.).

FIG. 1B illustrates an alternative embodiment in which the bound set 106 of FIG. 1A is separated into two components: a bound set 112 and a change support object 114. The bound set 112 contains the interface of bound set 106, while the change support object 114 contains the methods (that are part of the implementation) of the bound set 106. FIG. 1B also illustrates a "Support" pointer that the bound set 112 uses to point to the associated change support object 114; and a "Source" pointer that the change support object 114 uses to point to the associated bound set 112.

As will be discussed further below, the FIG. 1B embodiment is an embodiment tailored to certain programming environments, such as those written in the Java programming language, that make it difficult to have interface and implementation specified in the same component in a general manner. Note, however, in other embodiments (such as those developed in the C++ or other software language), segregation of the interface and implementation may not be used (resulting in the more efficient bound set 106 of FIG. 1A). The remaining components of the computer 100B of FIG. 1B are similar to corresponding components of computer 100A (and therefore are assigned the same reference numerals).

FIG. 2A shows an example arrangement of a first list 200 of pending change events and a second list 202 of listeners (and their associated change events). The FIG. 2A shows example states of the first and second lists 200 and 202. The FIG. 2A embodiment is based on the FIG. 1A embodiment (which contains bound set 106). Note that the bound set 106 can be replaced with the bound set 112 and the change support object 114 of FIG. 1B if the FIG. 1B embodiment is used instead. In the example of FIG. 2A, two change events 204 (event E1) and 206 (event E2) have been created to represent two distinct groups of changes to the bound set 106. Also, three listeners 208 (listener X), 210 (listener Y), and 212 (listener Z) have been registered for the bound set 106.

The list 200 of change events, according to one embodiment, is a linked list of pending change events to which the bound set 106 points (at 120). A "linked list" means that the elements of the list are linked in some order (to provide an ordered list) by means of a reference from each element to the next element, with the last element indicating that there is no further element. In alternative embodiments, other ordered structures, such as vectors or arrays, may be used. In the example depicted in FIG. 2A, two change events E1 (204) and E2 (206) are contained in the list 200 of change events. Change event E1 represents three changes that have been made to the bound set 106 addition of item A, item B, and item C). Listener X (208) points to change event E1. Change event E2 represents another distinct change (addition of item C) to the bound set 106. Listener Y (210) points to change event E2.

Note that change event E1 represents changes made to the bound set 106 since listener X was last notified of another change or, if the listener X has not yet been notified of a change, since listener X was registered as a listener with bound set 106. Similarly, change event E2 represents a change made to the bound set 106 since the corresponding listener Y was last updated. "Updating" a listener means providing a notification of one or more changes made to the bound set 106 since the listener was last notified of a previous group of one or more changes.

Also note that change event E2 was created after creation of change event E1. The addition of item C to the bound set 106 is reflected in both change events E1 and E2. The change "addition of C" is a single change made to bound set 106 that is contained in both change events E1 and E2. Change events E1 and E2 contain distinct groups of one or more changes. At the time that change event E1 was created, the bound set 106 did not contain items A, B, or C. In contrast, at the time that change event E2 was created, the bound set 106 contained items A and B (previously added) but did not contain item C.

In other words, when change event E1 was created, the bound set 106 contained a first content. Later, when change event E2 was created, the bound set 106 contained a second, different content (namely the first content plus the changes made in change event E1). Thus, plural change events in the linked list 200 represent distinct groups of changes made to distinct contents of the bound set 106. As will be described below, this state of affairs most likely came about due to the addition of item C to bound set 106 taking place during the response of listener Y to notification of the addition of items A and B.

The linked list 200 is represented by list elements 214 and 216 (which are data structures for representing the list 200 and for tracking an order of respective change events). The change event 204 is associated with list element 214, and the change event 206 is associated with list element 216. If additional change events are represented in the list 200, then additional list elements would be present in the list 200. The arrow pointing from list element 214 to list element 216 indicates that, in the linked list 200, change event E1 occurred before change event E2.

The second list 202 is a circular list of listeners and associated events. The list 202 is circular in the sense that the last element, list element 222, rather than indicating that it is the last element, contains as its "next element" reference a pointer to the first element, list element 218. This results in list elements (e.g., 218, 220, 222) being connected in a loop. Each list element refers to a listener and, in some cases, to a change event, where each list element represents an association between a listener and a change event. In the example of FIG. 2A, the list 202 includes listeners 208, 210, and 212 associated with corresponding list elements 218, 220, and 222. The list elements 218, 220, and 222 also point to respective change events (or null if a change event is not associated with a particular listener). In the example of FIG. 2A, listener X is associated (by list element 218) with change event E1, listener Y is associated (by list element 220) with change event E2, and listener Z is not associated with any change event. Even though listener Z is not associated with any change event, the semantics of the structure dictate that listener Z should be notified of change event E2. How this is accomplished is discussed further below. There are other mechanisms other than linked lists for implementing circular lists, including arrays, vectors, and ring buffers. In particular, it may be desirable to implement the circular list as a doubly-linked list (one in which each node refers to the previous node as well as to the next node) to facilitate the removal of nodes.

In the example of FIG. 2A, the First Listener pointer 122 and First Up-to-Date Listener pointer 124 can point to null (0) or to one or more of the listeners 208, 210, and 212. The pointers 122 and 124 are used to keep track of the first listener (the registered listener that has been on the list 202 the longest since the time the listener was added or last invoked) and the first up-to-date listener (the oldest listener for which the set has not changed since the listener was added or last invoked). As noted above, if the First Listener pointer 122 and First Up-to-Date Listener pointer 124 point to the same listener in the list 202, then all listeners have been updated with change events for all changes to bound set 106 from the time they were registered up until the present. While the (circular) order of the listeners in the circular list of listeners 202 does not change (other than by the registration and un-registration of listeners), the notion of which listener is first is constantly changing based on the addition of change events and updates (as discussed further below).

In the ordered list 202 of listeners, if the First Up-to-Date Listener pointer 124 points to one of the listeners, then a first portion (referred to as a "prefix") of the list 202 contains not-up-to-date listeners (those listeners up to, but not including the listener pointed to by the First Up-to-Date Listener pointer), and a second portion (referred to as a "suffix") of the list 202 contains not-up-to-date listeners (those listeners from the listener pointed to by the First Up-to-Date Listener pointer through the last listener in the list).

At some point, described below, logic in the system decides that it is time to inform the registered listeners of a bound set 106 about recent changes. This process of informing the listeners is referred to as "firing" the change events associated with the bound set 106 and takes the form of iterating over the list 202 of listeners. Each iteration causes invocation of a listener to update the listener with the corresponding change event. Note that an invoked listener can itself make further changes to the bound set 106, which would result in nested iterations to be performed for notifying listeners of the further changes.

The registration of listeners and invocation of events are defined by the bound set itself (e.g., 106 in FIG. 1A or 112 and 114 in FIG. 1B), which means that external code does not have to be defined to determine when to register listeners and invoke events. Also, from the perspective of users (a user can be another software module) of the bound set, the bound set provides the interface of and can be treated as a normal set (that is, a set as normally construed), and the firing of change events is a consequence of normal set modification operations.

Change events that are propagated contain not just information that a change has occurred to the set, but also information indicating what change(s) was (were) made (e.g., items A, B added; item C added, etc.). Information regarding what changes were made is useful in some contexts.

A further efficiency provided by some embodiments is that it is possible for a user (which may be a software module) of the set to specify that a potentially complex set of changes, implemented perhaps as multiple separate invocations of the set's modification methods, should be considered as a single complex change. This enables the system to ensure that each registered listener is invoked at most once (and not at all if the net effect of all changes is to leave the set unchanged) with a change event that reflects all of the modifications. This avoids the computational expense of having each listener informed of each separate individual change and, in particular, allows listeners to avoid doing work that will have to be undone or redone when the next invocation occurs.

As mentioned above, the information provided to each listener by its respective change event contains a description of all and only the changes made to the bound set between the last invocation of the listener and the present (or since the time the listener was registered with the bound set if this is the first time the listener has been invoked).

Enhanced efficiency is achieved by some embodiments by further detecting when changes made to a bound set cancel each other out. If changes to the bound set cancel each other out, then logic according to some embodiments makes a decision to forgo notification of the listener (in other words, the logic makes a determination that the listener is not to be notified), since the net effect is that no real change has been made to the bound set since the last time the listener was invoked (or since the time the listener was registered), and the change event provided to the listener would contain a description of no change. For example, since the last time a listener was called, item A may have been added to the set, followed by removal of item A from the set. These two changes to the set constitute one example of changes that cancel each other out resulting in no actual change to the set. Note that because different listeners may have registered or last been invoked when the bound set contained different contents, a particular modification may result in a change from the point of view of one listener and no change from the point of view of another.

In some embodiments, a listener can easily remove itself (either by explicitly un-registering itself or by indicating a desire to do so by returning a particular value when invoked) from the list 202 so that the listener is no longer notified of changes to the set. Often, a listener may only wish to fire once, after which the listener can remove itself from the list 202. An un-registered listener will not be invoked as a result of future changes to the bound set 106. In one embodiment, an un-registered listener will also not be invoked as a result of changes that have already occurred but which that particular listener has not been invoked with a change event.

Figures 6, 7:
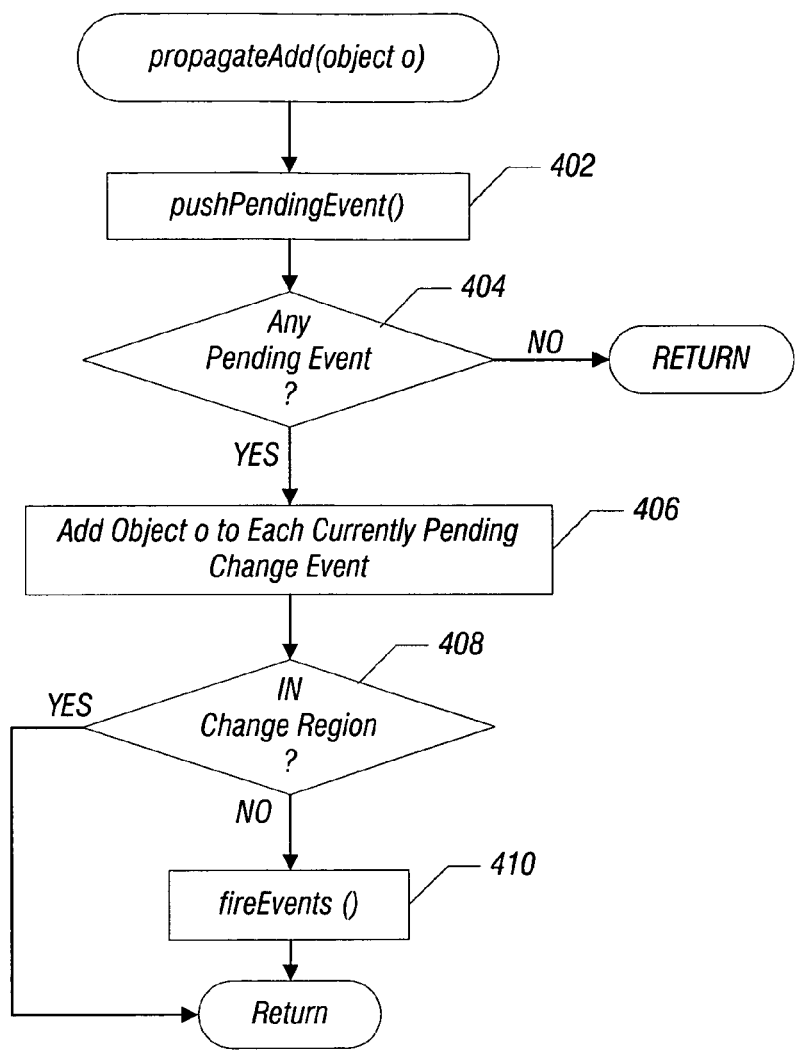
FIG. 6 depicts a change event object according to an embodiment.
FIG. 7 is a flow diagram of a process performed by a software method for propagating the addition of an object, according to an embodiment.

The change event object 250 according to an embodiment is depicted in FIG. 6. The change event object is associated with the following objects: Source, Added, Removed. The Source object is the bound set which was modified. The Added object is an ordinary set which contains those items that have been added to the bound set during the time period described by the change event. The Removed object is an ordinary set which contains the items that have been removed from the bound set. In some embodiments the change event object 250 is also associated with a Boolean "Cleared" parameter, for which a "true" value indicates that the modifications to the set involved (perhaps among other things) clearing the set. This parameter allows certain optimizations on the part of the listener in some situations. The change event object 250 also contains another Boolean field, "worthRais-ing", which is used by the propagation mechanism described below to keep track of whether changes cancel one another out and that therefore listeners associated with the event should not be invoked.

The following defines various components using Java code or pseudocode, according to one example embodiment. Note, however, that the various components discussed can alternatively be implemented in other programming languages, such as C++, Perl, Python, Lisp, Smalltalk, or other software languages with appropriate modifications necessitated or enabled by the syntax of and programming style encouraged by the chosen language or languages. The definitions of various components provided below are intended as examples—in other embodiments, other definitions can be provided to define bound sets and associated objects and methods. In particular, what are, due to the vagaries of the Java programming language, referred to as "interfaces" or "classes" may, in a different language be considered to be the same type of thing—e.g., in C++ they would all be classes, while other languages may use still other words to describe the basic class construct. For example, in certain dialects of Lisp, they would be called "flavors". Also, some of the following code would be organized differently in languages which allow (as Java does not) a class to multiply inherit from more than one class or allows (as Java did not until recently) a class to be parameterized (as a "template") by one or more other classes. The example implementation assumes that the bound set can contain elements of any type (denoted in Java by the Object class). In other embodiments, the implementation may be specialized to allow the bound set to contain only elements of a certain type or to be a templated implementation parameterized by the type instances are allowed to contain.

In one example, the bound set 112 of FIG. 1B (or, equivalently, the bound set 106 of FIG. 1A) is an instance of an interface defined as follows:

```
interface BoundSet extends Set {
    void    addContentsChangeListener(ContentsChangeLis-
        tener lstnr);
    void    removeContentsChangeListener(ContentsChange-
        Listener lstnr);
    void removeContentsChangeListenerByClass(Class c);
    boolean hasContentsChangeListener( );
    void beginChange( );
    void endChange( );
}
```

The bound set interface (called "BoundSet") extends (derives from) another interface, called "Set," which is well defined by Java. (Similar interfaces or classes may be provided by other languages, by libraries, or written by programmers.) An instance of a first interface that extends a second interface provides all methods of both interfaces. Thus, in the example definition of BoundSet above, the BoundSet interface inherits all methods of the Set interface, which may include methods to add elements to or remove elements from the set, query whether an object is an element of the set, iterate over all elements of the set, or obtain the number of elements in the set. The Set interface may further derive from other interfaces, whose methods objects implementing the Bound-Set interface would also provide. In addition, the BoundSet interface also declares additional methods (including the add-ContentsChangeListener( ), removeContentsChangeListener( ), removeContentsChangeListenerByClass( ), hasContentsChangeListener( ), beginChange( ), and endChange( ) methods).

Since Java does not allow interfaces to have implementation, an implementation for BoundSet according to one embodiment as shown in FIG. 1B is defined below (as the AbstractBoundSet class):

```
abstract class AbstractBoundSet extends AbstractSet
    implements BoundSet {
  protected ContentsChangeSupport ccSupport;
  protected    ContentsChangeSupport    getSupport-
      Object( ) { ... }
  protected void propagateAdd(Object o) { ... }
  protected void propagateAddAll(Collection coll) { ... }
  protected void propagateClear( ) { ... }
  protected void propagateRemove(Object o) { ... }
  protected   void   propagateRemoveAll(Collection
      coll) { ... }
  // plus BoundSet methods
  ...
}
```

The class AbstractBoundSet class implements most of the BoundSet interface. In this implementation, AbstractBoundSet extends a standard Java class named AbstractSet. The "abstract" modifier on the class definition implies that the definition is incomplete, that further definition will be required to fully define a class to the point at which instances can be created. In particular, this class does not provide implementations of methods that enable the class to behave as an ordinary set. Some of these methods will contain code (described below) to correctly implement some embodiments.

The bound set interface (BoundSet) includes methods addContentsChangeListener (for registering a listener "lstnr"), removeContentsChangeListener (for un-registering or removing a single listener "lstnr"), removeContentsChangeListenerByClass (for un-registering or removing all listeners of a particular class without having to know their individual identities), hasContentsChangeListener (for determining if any listener is associated with the bound set), beginChange (to begin a group of one or more changes), and endChange (for ending the group of one or more changes).

As described further below, the beginChange and endChange methods allow multiple changes to be made to a bound set before a listener (or plural listeners) are notified of any of the changes in the group of one or more changes. The use of the beginChange and endChange methods allows for greater efficiency in notifying listeners after several changes are made to the bound set (rather than providing a notification for each change, which would result in substantially larger number of invocations of listeners).

The AbstractBoundSet class has a member of type ContentsChangeSupport, which is the change support object 114 of FIG. 1B. The AbstractBoundSet class delegates various methods as well as the methods declared by BoundSet to the ContentsChangeSupport object. The AbstractBoundSet class further declares that each instance contains a (possibly and initially null) pointer named "ccSupport", which is a pointer to the change support object 114. Thus, in FIG. 1B, the ccSupport pointer is labeled "Support". The AbstractBoundSetClass also defines a method getSupportObject that is called to determine if the instance's ccSupport points to a change support object. If a change support object does not exist for the bound set, then the getSupportObject method creates the change support object and sets the instance's ccSupport pointer to refer to it. The methods and fields declared by the AbstractSupportObject class are declared to be "protected", which in Java means that they are not considered to be part of the public interface of instances of the class but are rather intended to be used by implementations of subclasses. In other embodiments, other protection levels can be chosen, and implementations in other programming languages will choose from among the protection levels provided by those languages if the languages have a concept of protection.

Alternatively, in an implementation of the embodiment depicted in FIG. 1A, there would be no separate ContentsChangeSupport object and no ccSupport pointer or getSupportObject method. Rather the methods of AbstractBoundSet (including those inherited from BoundSet) would be defined by AbstractBoundSet rather than being delegated to a separate object. The advantage of having the separate object is that it reduces overhead by allowing bound set objects to be smaller in the common case in which no listeners are actually registered.

The other methods of the AbstractBoundSet implementation include methods called by other methods that modify contents or note that contents have been modified: propagateAdd (for propagating the addition of an object "o"), propagateAddAll (for propagating the addition of a collection of objects "coll"), propagateClear (for propagating the clearing of a bound set); propagateRemove (for propagating the removal of an object "o"), and propagateRemoveAll (for propagating the removal of a collection of objects "coil").

In other embodiments, additional methods may be provided to atomically combine the propagation of the removal of elements and the information that such removal constitutes clearing the set. In yet further embodiments, no method may be provided specifically for propagating the notion that the bound set has been cleared. In some embodiments only the propagation methods for the addition or removal of entire collections or of single elements, but not both, may be provided.

The propagate methods that are part of the AbstractBoundSet implementation are used by subclasses for propagating a change made to a bound set to listeners. One such subclass is BoundHashSet, which is logically a subclass of both AbstractBoundSet and HashSet (which is a set that uses hash tables, as defined by Java) but which, because of the rules of the language, which rule out such "multiple inheritance" is implemented by extending HashSet and incorporating the details of the definition of AbstractBoundSet. (In an alternative embodiment, AbstractHashSet could extend AbstractBoundSet and delegate all of its set-related methods to a HashSet member.) A "subclass" is a class that inherits from another class. On the other hand, a superclass is a class that is inherited by another class. Thus, HashSet is a superclass of BoundHashSet.

Implementing one subclass with BoundHashSet is merely an implementation detail that illustrates one example embodiment. Such implementation details can be omitted or changed in other embodiments.

The BoundHashSet subclass overrides several basic set operations, (defined by HashSet), providing its own implementation, which will be the one used by instances of BoundHashSet. These overridden methods include a method add( ). The method add( ) is changed as follows:

```
boolean add(Object o) {
boolean val=super.add(o);
If (val) {
   propagateAdd(o);
}
return val;
}
```

In the subclass BoundHashSet, the add( ) method first delegates to the add( ) method of the superclass HashSet, in the call to super.add(o) (in other words, the add( ) method of the superclass HashSet is invoked, actually adding the Object o to the set's underlying representation, as defined by the HashSet class). If super.add( ) returns true, then, by the semantics of the standard Java Set interface, that means that an addition has actually resulted in a change to the bound set, and that the addition should be propagated to any listeners, by invoking propagateAdd(o).

The BoundHashSet overrides the remove( ) method in similar fashion, as follows:

boolean remove(Object o) {
        boolean val=super.remove(o);
        If (val) {
            propagateRemove(o);
        }
        return val;
    }

Note that the add( ) and remove( ) methods of BoundHashSet return the "val" value returned by the respective superclass add( ) or remove( ) method since the ones calling add( ) and remove( ) will expect the return value to declare whether or not the addition or removal resulted in a change to the bound set (considered as an ordinary set).

More generally, the add( ) and remove( ) methods are defined to add or remove objects from a set, with the add( ) and remove( ) methods calling respective propagateAdd( ) and propagateRemove( ) methods in response to a change (adding an object or removing an object) to the set.

To add multiple items (in a collection "c") to a bound set, the following addAll(Collection c) (overriding the addAll method of HashSet) is called:

boolean addAll(Collection c) {
        if (!hasContentsChangeListener( )) {
            return super.addAll(c);
        }
        beginChange( );
        boolean val=super.addAll(c);
        endChange( );
        return val;
    }

As depicted in FIG. 3, the addAll( ) method of BoundHashSet calls the hasContentsChangeListener( ) method to determine (at 302) if the bound set has any listeners registered. If not, then the hasContentsChangeListener( ) method will return a false value. If there are no registered listeners, then the superclass's addAll(c) method is delegated to and the value returned is returned as the value of the method. This delegation will (because of the way HashSet is implemented) result in multiple calls to the instance's add( ) method, one per element of the collection. In other words, the addition of items in collection c can be made to the bound set, by calling (at 304), in the superclass's addAll( ) method, the add( ) method multiple times to add the items. This delegation will result in multiple calls to propagateAdd( ), but since there are no listeners, this will not result in any further activity.

However, if there are any listeners registered, then the call to the superclass method addAll(c), super.addAll(c), is "wrapped" in a "change region." The "change region" is defined by beginChange( ) and endChange( ), with the call of super.addAll(c) invoked within this change region. The purpose for wrapping the call of super.addAll(c) in the change region is so that multiple changes (represented by adding multiple items to the bound set) can be made to the bound set without creating multiple change events and calling listener(s) multiple times, which would be inefficient. Note that in most scenarios, a listener does not care to be notified about each individual change made to a bound set, but rather, the listener typically wishes to learn that some change has been made to the set (and what those changes are).

In accordance with some embodiments, one change event is created and one call of the listener is performed when making the collection of changes to make the change notification process more efficient. As depicted in FIG. 3, this is accomplished by first calling (at 306) beginChange( ) to start the change region, calling (at 308) add( ) multiple times to add the multiple items, and then calling (at 310) the endChange( ) method to end the change region. Since HashSet's addAll(c) method is implemented by calling the add(o) method multiple times, with "o" being an object from collection "c", this may result in multiple calls of propagateAdd( ). However, the ContentsChangeSupport logic ensures that no events are actually propagated until endChange( ) is reached. (The principal reason for checking whether listeners exist is that in this embodiment the call to beginChange( ) will call getHandlerObject( ) and will result in the creation of a ContentsChangeSupport object for the bound set even if there are no listeners. In the alternative embodiment depicted in FIG. 1A, in which there is no separate ContentsChangeSupport object, the call to hasContentsChangeListener( ) can be omitted and beginChange( ) and endChange( ) can be called unconditionally.)

Similarly, removing multiple items from the set is performed by calling the removeAll(Collection c) method defined by BoundHashSet:

boolean removeAll(Collection c) {
        if (!hasContentsChangeListener( )) {
            return super.removeAll(c);
        }
        beginChange( );
        boolean val=super.removeAll(c);
        endChange( );
        return val;
    }

More generally, the addAll( ) and removeAll( ) methods are called to add or remove a collection of objects from a set—the addAll( ) and removeAll( ) methods contain logic to wrap multiple changes (multiple additions or multiple removals) in a change region that prevents propagation of the changes until all of the collection of objects have been added to or removed from the set.

As indicated by the Java code above, when an item is added to a set (by using either the add( ) method or the addAll( ) method), a propagateAdd( ) method (defined as either part of the bound set or the change support object), is called to propagate the item addition event. Similarly, when an item is removed from a set (by using either the remove( ) method or the removeAll( ) method), a propagateRemove( ) method (defined as either part of the bound set or the change support object), is called to propagate the item removal event.

For the clear( ) method, which clears a set, the old content of the set is preserved so that an event can refer to old content as removed items:

void clear( ) {
        if (!hasContentsChangeListener( )) {
            super.clear( );
            return;
        }
        Collection oldContents=Arrays.asList(toArray( ));
        Super.clear( );
        propagateClear(oldContents);

In the clear( ) method, if there are no listeners, the superclass clear( ) method, super.clear( ), is invoked to clear the set. However, if there are any listeners, the original content of the set is copied into a collection oldContents, followed by calling super.clear( ) to clear the contents of the set, and calling propagateClear(oldContents) to propagate the old content of the set to listeners.

Effectively, the clear( ) method is similar to the remove( ) method except that the entire content of a set is removed and the original content of the set is maintained in a data structure, oldContents.

The above has described the definition of a bound set (and various components associated with a bound set) to enable the propagation of changes to bound set listeners. The event logic is next discussed below.

In the code for the BoundSet abstract interface set forth above, the addContentsChangeListener and removeContentsChangeListener methods are used to register and unregister, respectively, an object that implements the ContentsChangeListener interface. ContentsChangeListener is an interface defined as follows:

```
interface ContentsChangeListener {
    boolean contents Changed(ContentsChangeEvent e);
}
```

The interface ContentsChangeListener is called when contents of the corresponding set has changed. The change or changes made to the set are passed through a change event (event "e" of type ContentsChangeEvent, where "e" is a parameter) by invoking a method ContentsChange( ). The return value from the ContentsChange( ) method is a value that indicates whether a listener should be retained as a listener by the bound set (return value is true) or removed as listener (return value is false). A return value indicating whether a listener should be retained or removed is actually set by the listener itself—if a listener wishes to un-register itself as a listener of a particular set, it would cause the ContentsChange( ) method to return a false return value. This provides a convenient mechanism for the listener to un-register itself so that the listener is no longer notified of subsequent change events. In response to receiving an indication (in the form of the return value from ContentsChange( )) that a listener is to be un-registered from the bound set, the listener is un-registered from the bound set by calling the method removeContentsChangeListener provided by BoundSet. The logic then ensures that the un-registered listener is not notified of any change event associated with the un-registered listener.

The ContentsChangeEvent class has the following definition:

```
class ContentsChangeEvent {
    BoundSet getSource( );
    Set getAdded( );
    Set getRemoved( );
    boolean isCleared( );
    ContentsChangeEvent(BoundSet Source);
    void add(Object o);
    void addAll(Collection c);
    void remove(Object o);
    void removeAll(Collection c);
    void setCleared( );
    boolean isWorthRaising( );
    private final BoundSet source;
    private HashSet added;
    private HashSet removed;
    private boolean cleared=false;
    private boolean worthRaising=false;
}
```

The last five lines of the code for the ContentsChangeEvent class represent elements of the change event depicted in FIG. 6.

The following methods defined in the ContentsChangeEvent class are used by listeners to obtain various information regarding a change event: getSource( ) to obtain the source of the event, (which is a bound set as depicted in FIG. 6); getAdded( ) (which obtains the Added set as depicted in FIG. 6); getRemoved( ) (which retrieves the Removed set as depicted in FIG. 6); and isCleared( ) (which determines whether the bound set was cleared first based on the cleared parameter depicted in FIG. 6). The source bound set is associated with the ContentsChangeEvent object when the latter is created. Alternative embodiments may omit these methods and provide direct read access (in some embodiments denying direct write access) to the corresponding state information.

The methods add(Object o), addAll(Collection c), remove (Object o), removeAll(Collection c), and setCleared( ) are used to modify the state of the ContentsChangeEvent. These methods are intended to be called only by ContentsChangeSupport objects (or in embodiments which lack ContentsChangeSupport objects, BoundSetObjects) from within the various propagate methods. In embodiments in languages which allow such specification, the protection of these methods may be set so as to only allow calls from such objects or from within such methods.

The isWorthRaising( ) method returns the value of the worthRaising parameter. It is intended to be called only during the fireEvents( ) method described below. (Alternative embodiments may provide direct read access to the parameter.) The value returned by the isWorthRaising( ) method reports the condition of at least one of the Added set and the Removed set (FIG. 6) existing and being non-empty. In an alternative embodiment, the wortRaising parameter is omitted and the isWorthRaising( ) method tests this condition directly. The ContentsChangeEvent guarantees that no item is in both the Added set and the Removed set. To ensure this, the add( ) method first checks to see whether the item being added is already contained in the Removed set. If the item is in the Removed set, then what is being added is something that was previously removed, so the event now reflects the fact that the two actions cancelled one another. In such a case, the item is removed from the Removed set and not added to the Added set: If such a removal results in both sets being empty, the worthRaising flag is cleared (set to false). However, if the item had not previously been removed (that is, the item is not in the Removed set), then the item is added to the Added set (which is created if not already there). Because there is now an item in the Added set, the event is flagged as being worth raising by setting worthRaising to true. Similar logic is applied in response to the remove( ) method, addAll( ), and removeAll( ) methods.

The change support object (named "ContentsChangeSupport" in the definition of the AbstractBoundSet class above) contains four components: the bound set to use as a source for events created by the change support object; a change level parameter (changeLevel); a circular list of listeners and associated events; and a linked list of pending events.

In the embodiment depicted in FIGS. 1A and 2A, the change support object actually does not exist. In such an embodiment, the components listed above are part of the bound set instead of the change support object.

As shown in FIG. 4, the changeLevel parameter, which is set to have a value of zero at the time the ContentsChangeSupport object is created, is incremented (at 312) each time the beginChange( ) method is called. As depicted in FIG. 5, each time the endChange( ) method is called, the parameter changeLevel is decremented (at 320). Thus the changeLevel counts the number of calls to beginChange( ) that have not been matched by calls to endChange( ). The endChange( ) routine also determines (at 322) if the parameter changeLevel parameter is equal to zero. If not, then control returns. However, if the changeLevel parameter is equal to zero, then the BoundSet is no longer within a complex change and a method fireEvents( ) is called (at 324), which performs notification of registered listeners of pending events in the linked list 200 (FIG. 2A) of change events. The process for the fireEvents method is described in connection with FIG. 8 below.

As depicted in FIG. 7, the propagateAdd( ) method of the AbstractBoundSet class, which delegates control to the similar method on the AbstractBoundSet's associated ContentsChangeSupport object if such exists, (invoked from within an add( ) method or addAll( ) method) propagates addition of an object "o" to the set. In one example embodiment, the Java code for the propagateAdd( ) method is provided below:

```
Void propagateAdd(Object o) {
  pushPendingEvent( );
  if (pendingEvents==null) {
    return;
  }
  for (Iterator iter=pendingEvents.iterator( ); iterhasNext( );)
  {
    ((ContentsChangeEvent)iter.next( )).add(o);
  }
  if (changeLevel==0) {
    fireEvents( );
  }
}
```

The propagateAdd( ) method first invokes (at 402) a pushPendingEvent( ) method, which checks to see if there are any up-to-date listeners by checking to see whether the First Up-to-Date Listener pointer 124 (FIG. 2A) points to a list element rather than to null. If so, then an event has to be associated with the up-to-date listeners to be passed to them when next invoked and to reflect all modifications to the bound set starting with the current modification, and the pushPendingEvent( ) method creates the corresponding, initially-empty, event. The created event is associated with the first up-to-date listener (pointed to by the First Up-to-Date Listener pointer 124) by modifying the pointed-to list element to point to it. After creating this new change event, the pushPendingEvent( ) method indicates that there are no longer any up-to-date listeners, by causing the First Up-to-Date Listener pointer 124 to point to null. The newly created event is added to the end of the list 200 (FIG. 2A) of pending events by causing the previously last element of this list to point to a newly created list element that refers to the newly created event. In an alternative embodiment, distinct new events may be created and associated with each previously up-to-date listener.

Upon return from the pushPendingEvent( ) method, the propagateAdd( ) method determines (at 404) if there are any pending events. If not, that means that there are no registered listeners for the set, so nothing needs to be done and control returns from the propagateAdd( ) method. However, if any pending event is detected to be present at 404, then the propagateAdd( ) method adds (at 406) object "o" to each currently pending change event. Addition of object "o" to each currently pending change event includes adding the object "o" to any new change event newly created by the PushPendingEvent( ) method.

Next, the propagateAdd( ) method determines (at 408) if the system is currently in a change region (indicated by the parameter changeLevel not equal to zero). As noted above, a change region (defined by calls to beginChange( ) and endChange( )) means that multiple changes are being made to a bound set. To avoid multiple calls to a listener and multiple notifications, the system waits until the system is no longer in a nested change (changeLevel equal to zero) before calling the fireEvents( ) method (at 410). In other words, when changeLevel equals to zero, the system is not in (i.e., was not in or has exited) the change region.

The propagateRemove( ) method is similarly defined as follows:

```
Void propagateRemoveObject o) {
  pushPendingEvent( );
  if (pendingEvents==null) {
    return;
  }
  for (Iterator iter=pendingEvents.iterator( ); iter.hasNext( );) {
    ((ContentsChangeEvent)iter.next( )).remove(o);
  }
  if (changeLevel==0) {
    fireEvents( );
  }
}
```

The logic flow for the propagateRemove( ) method is similar to the logic flow for the propagateAdd( ) method.

The implementation of bound set objects must ensure that any change to the contents of the bound set, when considered as an ordinary set, must result in a call to propagateAdd( ) or propagateRemove( ). In some embodiments there may be ways of making such modifications that do not involve interacting with the BoundSet object directly. For example, in Java, the Collection interface (which BoundSet implements) specifies that all instances must implement an iterator( ) method to hand out an Iterator object capable of enumerating the elements of the collection in some order. One method an Iterator has to provide is the remove( ) method, which removes from the collection the last item enumerated. To provide such an object which maintains the guarantee that propagateRemove( ) is called when an item is removed, the iterator( ) method for BoundHashSet is defined as follows:

```
Iterator iterator( ) {
  final Iterator iter=super.iterator( );
  return new Iterator( ) {
    object last;
    public void remove( ) {
      iter.remove( );
      propagateRemove(last);
    }
    public boolean hasNext( ) {
      return iter.hasNext( );
    }
    public Object next( ) {
      return last=iter.next( );
    }
  };
}
```

The Iterator returned by the method holds a reference to an Iterator created by its HashSet superclass. This object knows how to actually remove an object from the underlying set. Whenever an element is handed out by the next( ) method, the element is remembered in the "last" parameter. Thus when the remove( ) method is called, the Iterator knows what object was removed, and this can be passed to the propagateRemove( ) method.

Similarly, if a collection's generic interface allows the retrieval of objects that represent subcollections or views on the collection and these objects permit modification of the underlying collection, such objects must ensure that any modifications are correctly propagated.

The fireEvents( ) method of the ContentsChangeSupport class is defined as a loop that iterates until all registered listeners (if there are any) are up-to-date. This will happen when either both the First Listener pointer 122 and First Up-to-Date Listener pointer 124 are null (there are no registered listeners) or both point to the same listener.

Figure 8:
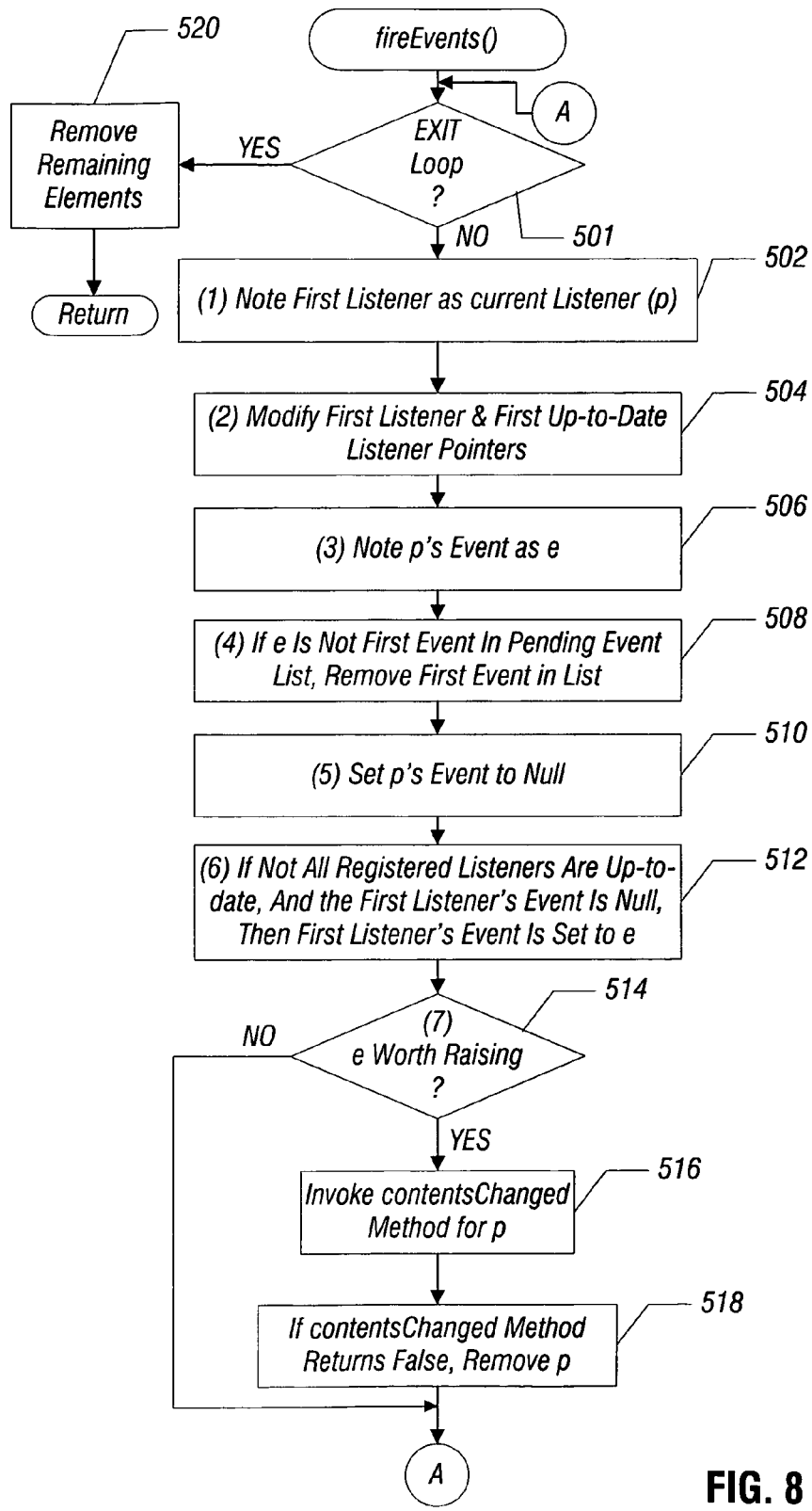
FIG. 8 is flow diagram of a process performed by a software method to notify listeners of events, in accordance with an embodiment.

The process of the fireEvents( ) method is described in connection with FIGS. 8 and 9. FIG. 8 shows the general flow of the fireEvents( ) method, while FIG. 9 shows an example scenario described in the context of FIGS. 2A and 2B.

In the example of FIG. 2A, there are two change events E1 and E2 that are pending, where event E1 represents the addition of items A, B, and C, while change event E2 represents the addition of item C. In the first iteration ("iteration 1" in FIG. 9) following the state represented by FIG. 2A, the First Up-to-Date Listener pointer 124 points to a null value, while the First Listener pointer 122 points to listener X (208 in FIG. 2A). (In this discussion "pointing to a listener" should be understood to mean "pointing to the unique list element associated with the listener".) In the flow of FIG. 8, numbers in parenthesis, such as (1), (2), etc., correspond to the same reference numbers in the example of FIG. 9. Thus, task 502 of FIG. 8 corresponds to step (1) each iteration of FIG. 9, task 504 of FIG. 8 corresponds to step (2) in each iteration of FIG. 9, and so forth.

The fireEvents( ) method first determines (at 501) if the loop should be exited. The loop is exited if the First Listener pointer 122 and the First Up-to-Date Listener pointer 124 point to the same listener (or both pointers have a null value). (Upon exiting, any remaining element in the list 202 is removed (at 520) from the list). The fireEvents( ) method next notes (at 502) the first listener as being the current listener (by setting a parameter p to the first listener). In the example of FIG. 9, in iteration 1, parameter p is set to indicate listener X (which is the first listener at this time). Next, the fireEvents( ) method modifies (at 504) the First Listener pointer 122 to point to the next listener (in iteration 1 of FIG. 9, the First Listener pointer is changed to point to listener Y). Effectively, the current listener (p) becomes last listener in the list 202. If the first up-to-date listener pointer 124 is null (indicating that there are no up-to-date listeners, the fireEvents( ) method also modifies (at 504) the first up-to-date listener to be the current listener (p) (in FIG. 9, the first up-to-date listener is modified to be set to listener X). Whether or not the first up-to-date listener pointer is modified, the current listener (p) will now be considered to be up-to-date. Also note that the current listener (p) is considered to be at the end of the ordered list 202.

The current listener's (p) associated change event is noted as a parameter e (at 506). In the FIG. 9 example, in iteration 1, e is set to equal change event E1. If e is not the first event in the pending event list (200 in FIG. 2A), then the first event in the pending event list is removed (at 508) since there are no further listeners that are associated with it and it can be considered to be garbage (unless other references to it were stored away). In iteration 1 of FIG. 9, since E1 is the first event in the list, no event is removed from the list. Whether or not an event is removed from the list, the event referred to by parameter e will always, at this point, be the first element of the list.

Next, the fireEvent( ) method sets (at 510) p's associated event to null (which in iteration 1 of FIG. 9 means that listener X's associated event is set to null). Setting p's associated event to null is consistent with listener p being up to date (in other words, an up-to-date listener is not associated with any change events).

If not all registered listeners are up-to-date, and the first listener's event is null, then the first listener's event is set to e (at 512) by the fireEvents( ) method. In iteration 1 of FIG. 9, not all listeners are up-to-date at this time, but listener Y (which is presently the first listener) is not null, which means that nothing is done at 512. At this point, the listener pointed to by the first listener pointer 122 is guaranteed to be associated with an event unless it is up-to-date.

Next, the fireEvents( ) method determines (at 514) if event e is worth raising (based on the value of its worthRaising parameter as reported by its isWorthRaising( ) method). If not, nothing is done. However, if the event e is worth raising, then the event e is processed. In iteration 1 of FIG. 9, change event E1 is processed because it is worth raising (this is because the Added set, depicted in FIG. 6, is not empty but contains items A, B, C). To process the change event e, the fireEvents( ) method invokes (at 516) the contentsChanged( ) method for the current listener p. Invoking the contentsChanged( ) method is effectively a call of the listener p. The contentsChanged( ) passes the change event e (in iteration 1 of FIG. 9 the change event e is E1). If the contentsChanged( ) method returns a false value, then the fireEvents( ) method removes listener p (at 518). The false value is returned from the contentsChanged( ) method if the listener p decides to un-register itself from being notified of changes made to the bound set 106 (FIG. 2A).

In the example of FIG. 2A and FIG. 9, at the time right after performance of iteration 1, the First Listener pointer 122 points to listener Y while the First Up-to-Date Listener pointer 124 points to listener X. Therefore, the loop is not exited, which means that the fireEvents( ) method performs another iteration (iteration 2 in the example of FIG. 9).

In iteration 2, p is set to listener Y (task 502). The First Listener is set to listener Z and the First Up-to-Date Listener, since it is not null, remains listener X (task 504 in FIG. 8). Note that listener Y is now up-to-date (listener Y is now positioned in the circular list 202 following the up-to-date listener X.

The parameter e is set to point to change event E2 (which is the change event that now has to be propagated to listener Y) (task 506 in FIG. 8). Since E2 is not the first event in the list 200, change event E1 is removed from the list 200 (task 508 in FIG. 8). Listener Y's associated event is set to null (task 510 of FIG. 8), which means that listener Y is no longer associated with an event. Since not all listeners are up-to-date at this time, and listener Z's event is null, listener Z's event is set to point to change event E2. Previously, listener Z's change event had pointed to the null value (as depicted in FIG. 2A). Change event E2 is processed (tasks 514-518 of FIG. 8) because change event E2 is worth raising (because the Added set corresponding to change event E2 contains item C).

Figure 2B:
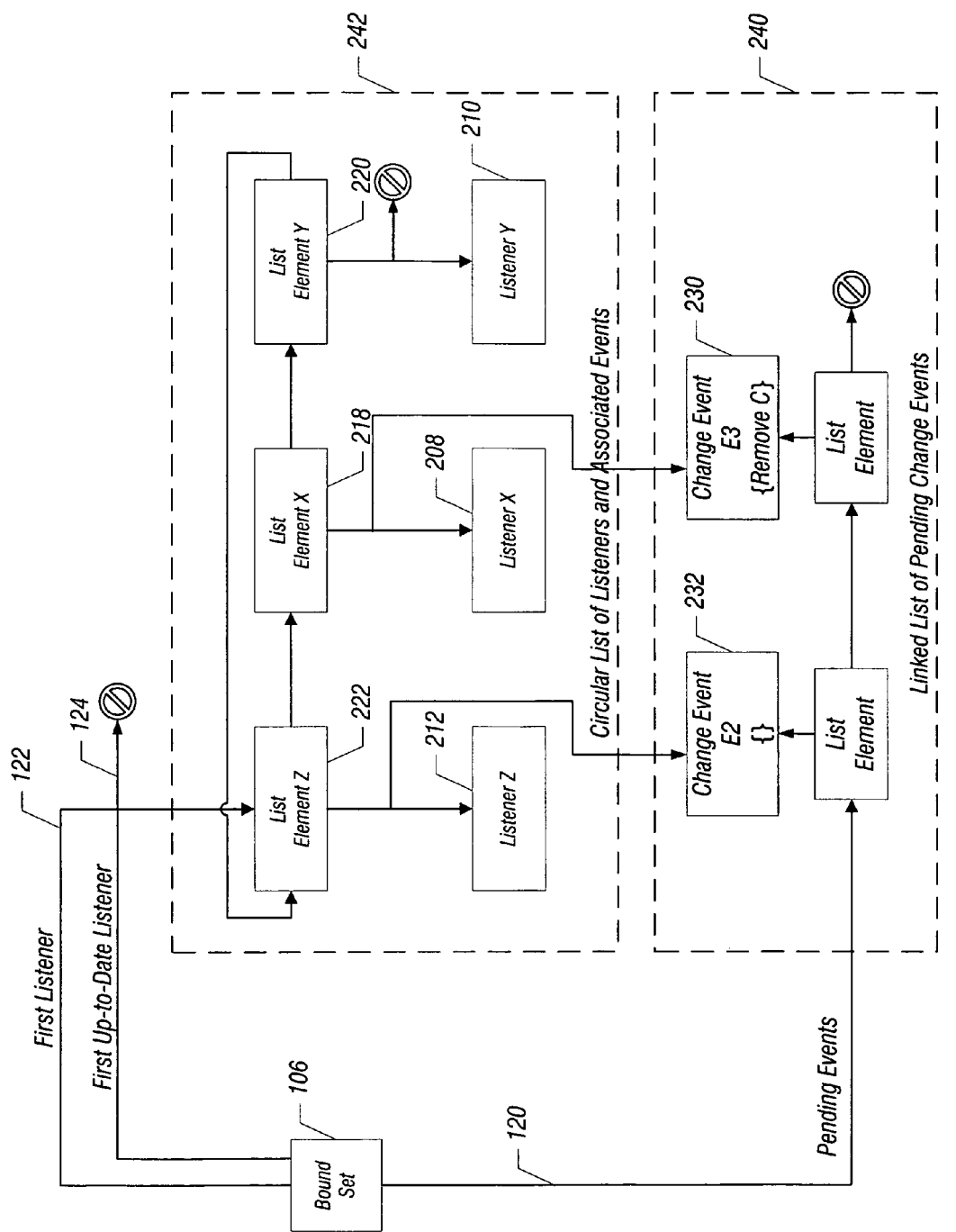

Note that iteration 2 involves a call to listener Y to notify listener Y of change event E2. It is possible that a listener can actually make another change to the bound set 106. In the example depicted in FIG. 9, as part of iteration 2, listener Y actually removes item C from the bound set, which causes the following to occur. Another change event E3 is created to represent the removal of item C from the bound set. This is depicted in FIG. 2B, where change event E3 is referenced as 230. Because change event E3 was added, that means that the First Up-to-Date Listener pointer 124 points to the null value (since no listeners are now up-to-date). Previously, note that listener X was indicated as the First Up-to-Date Listener; but because item C has just been removed from the bound set, which represents another change event, that means that no listeners are now up-to-date.

Item C is also removed from change event E2. Since E2 had previously represented the addition of item C, the subsequent removal of item C means that change event E2 (232 in FIG. 2B) now represents no modification at all—the bound set is in the same state it was in when listener Z was last invoked. The change events E2 and E3 are now part of a modified list 240

(modified from the list 200 in FIG. 2A). Also, circular list 242 contains a re-arranged order of the listeners.

The fireEvents( ) method is then called by the propagateRemoveQ method that was called to propagate the removal of item C from the bound set. This fireEvents( ) call is a nested call, which means that the fireEvents( ) method performs several iterations at a nested level that is nested inside the first fireEvent( ) call (iterations 1 and 2 discussed above).

In iteration 1 of the nested level, the First Up-to-Date Listener pointer is null and listener Z is the first listener (which was set in iteration 2 above). In iteration 1 of the nested level, p is set to listener Z (task 502), and the first listener is set to X and the first up-to-date listener is set to Z (task 504).

The parameter e is set to E2 (task 506). Since change event E2 is first in the list 240 (FIG. 2B), no event is removed from the list 240 (task 508). Listener Z's event is set to null (which means that listener Z no longer points to any event) (task 510).

Since not all listeners are up-to-date, but listener X's event is not null, the condition of task 512 is not satisfied so nothing further is done here (task 512). Next, change event E2 is not processed because it is not worth raising (task 514) from the perspective of listener Z. As noted above, change event E2 represents no modification to the bound set, due to the removal of item C after the addition of item C. The removal of item C after adding item C to the set cancel each other out such that no effective change has been made to the set. Consequently, the worthRaising parameter is set to the false value, and listener Z is not notified of change event E2.

Since not all listeners are up-to-date, iteration 2 of the nested level is performed by the fireEvents( ) method. At this time, listener Z is the first up-to-date listener, and listener X is the first listener. The parameter p is set to X (task 502), and the first listener is set to Y and the first up-to-date listener remains Z (task 504). The parameter e is set to E3 (task 506). Since E3 is not the first change event in the list 240, change event E2 is removed (task 508). Then, listener X's event is set to the null value (task 510). Since not all listeners are up-to-date, and Y's event is null (see FIG. 2B), listener Y's event is set to change event E3 so that change event E3 can be propagated to listener Y (task 512). E3 is processed to notify listener X because E3 is worth raising (removal of item C) (task 514).

At this stage, listener Z is the first up-to-date listener and listener Y is the first listener (which means that not all listeners are yet up-to-date). In iteration 3 of the nested level, the parameter p is set to Y (task 502), and the first listener is set to Z and the first up-to-date listener remains Z (task 504). Parameter e is set to E3 (task 506), and since E3 is first in the list 240 (note that E2 was previously removed in iteration 2 of the nested level), no event is removed from the list (task 508). Listener Y's event is set to null (task 510). Currently, since the first listener is listener Z and the first up-to-date listener is also listener Z, that means all listeners are up-to-date. E3 is processed (task 514) because it is worth raising to notify listener Y of the change event E3. Since all listeners are now up-to-date, the loop is exited (at 501 in FIG. 8) and the single remaining event (E3) is removed (at 520 in FIG. 8) from the pending event list by setting the pending events pointer to null.

Now control returns from the call to fireEvents( ) nested within the invocation of listener Y in (non-nested) iteration 2. Assuming that the implementation of this listener makes no further changes to the bound set, when it returns control will return to the outer call to fireEvents( ) in task 518. Since all listeners are still up-to-date, this loop is exited as well.

Although the embodiment described above with respect to FIG. 8 invokes the listeners one at a time, in alternative embodiments more than one up-to-date listener may be invoked simultaneously by means of separate threads of control, co-routines, or separate processes. As with the above embodiments, the invoked listeners would first be marked as up-to-date and would then have their methods called, with the appropriate change event objects passed as parameters.

In addition to simple bound sets which explicitly contain their own contents, it is also possible to define classes that behave as bound sets whose contents are computed based on the state of other objects and which are able to propagate changes to these computed contents when they logically change. In particular, it is possible to define classes whose instances instantiate the logic of set algebra. Set algebra defines set operations (e.g., unions, intersections, etc.) performed on plural sets. In the ensuing discussion, an "algebraic set" refers to a set built up from other sets (also referred to as "subsets") using set algebra. One example of an algebraic set is an immutable set difference object can be implemented as a bound set (referred to as a "difference object set"), constructed to refer to two other bound sets (one of the two bound sets being a base and the other of the bound sets being a filter). The difference object set represents the difference between the base and the filter. The actual set logic is straightforward. To answer whether the difference object set contains an object, the set logic checks to see that the base contains the object and the filter does not.

To iterate over its contents, the difference object set iterates over its base set, skipping over any elements contained in its filter set. "Iterating" over the content of a set refers to enumerating the elements of the set in some order. To compute the size of the difference object set, the difference object set simply iterates over its contents as noted, counting elements and storing the resulting size, which cached value can be returned until the difference object is no longer sure that it knows its size.

The difference object set also responds to changes in the contents of its base and/or filter sets. When constructed, the difference object set registers different listeners with its respective base and filter sets. In response to a change to the base set or filter set, the difference object set first checks to see whether the difference object set has any registered listeners (similar to the logic performed on an individual bound set described above). If there are no listeners, the difference object set simply notes that the difference object set no longer knows its own size (according to one example embodiment). A difference object set indicating that it does not know its own size is used as an indication that there are no listeners associated with the set. In other implementations, other indications that there are no listeners can be employed. The next time the difference object set is asked, the difference object set will have to recompute the size.

If the difference object set does have listeners, the difference object set will propagate any changes. Similar to the propagation logic discussed above for individual sets, the difference object set first calls beginChange( ) to delay any changes until the difference object set has processed the entire event (changes to the base and/or filter). The difference object set then walks through the added and removed items. If an item was removed from the base and the item was not in the filter, the set propagates the removal of the item as a remove and decrements the size (if known). If an item was added to the filter and the base does contain the item, the change is also propagated as a remove. If the resulting size (after all removes have been propagated) is known to be zero, a "clear" is propagated, signaling that all items of the difference object set were removed. Then the items added to the base (or removed from the filter) are walked to determine whether the items should be propagated as additions. Finally, the method endChange( ) is called to allow the propagation of events (unless this is within a nested call).

Effectively, any change to the base set or filter set will be propagated to a listener registered by the difference object set. The listener of the difference object set will in turn further notify registered listeners of the difference object set regarding changes to the difference object set, if the change to the base set or filter set would be construed, by the logic of the set difference function, to constitute a change to the contents of the difference object set.

Similarly, there are two simple forms of set union that can be provided. The most straightforward is the disjoint union set, which is a union of a fixed array of bound sets that are known to be disjoint (have no members in common). The size is computed at construction time as the sum of the sizes of the subsets, and to decide whether an item is a member of the disjoint union set, the subsets are simply asked in turn. Iteration is simply iteration over each subset of the disjoint union set in turn. The propagation logic (for propagating one or more changes to any subset) is straightforward: (1) beginChange( ) is called; (2) the size of any removed items is subtracted from the size of the union; (3) any removed items are propagated as removed items; (4) if the size of the union is now zero, a clear is propagated; (5) the size of any added items is added to the size of the union; (6) any added items are propagated as added items; and (7) endChange( ) is called.

Another simple form of union is the binary union set, which is the union of two possibly overlapping subsets. Membership is tested by asking the subsets. Iteration is accomplished by iterating over the first subset and then iterating over the second subset but skipping any items present in the first subset. The size, when asked for, is the sum of the sizes of the first and second subsets minus a degree of overlap computed by walking the smaller subset and seeing which items are also in the larger subset. This computed size may be cached until it is not known to be valid in a manner similar to that discussed with respect to the difference object set above.

As with all algebraic sets, a binary union set registers listeners with its subsets. When either subset of the binary union set propagates a change, if there are no listeners for the binary union set, the binary union set simply forgets what it knows about its size (according to one example embodiment). Otherwise, if listeners are registered, the binary union set begins a change by calling beginChange( ) iterates through the changes to the changed subset to propagate additions and removals for items not in the other subset, and ends the change.

A binary intersection can be implemented with similar logic, but with the binary intersection set considering an element to be a member only if it is a member of both of its subsets. Iteration is performed by walking over the smaller subset and testing membership of elements in the larger, and changes to the subsets are propagated.

A more general form of the set algebra classes is a general union. A general union is a generalization of the binary union which contains an arbitrary collection of subsets. The collection of subsets defining a general union set is dynamic, and new subsets can be added or removed by calling addSubset and removeSubset methods, for example. To avoid having to continually walk the list of subsets asking whether elements are members, the general union set will typically be implemented to actually contains its own contents in a normal set and forwards questions about membership and size to this set.

When a general union set is created, the method addSubset( ) is called for each of the initial subsets. When adding any new subset to the general union set, the addSubset( ) method first checks to ensure that any new subset defined as part of the general union set is not already in the general union set. If it is not, the general union set begins a change, adds the items of the new subset to the general union set, adds a listener for changes on the subset, and ends the change.

When a subset is removed, the general union set first checks to ensure that the subset to be removed is really a subset. If so, the general union set walks the contents of the subset to be removed and (in one example implementation) asks each of the other subsets whether each item of the subset to be removed is also a member of the other subsets. If not, the item can be removed. If such item is part of another subset, then the item is not removed. In some circumstances it might be more efficient to keep a separate count of the number of subsets that each item appears in. Then it would be a simple matter of decrementing this count each time the item is removed from a subset and propagating a removal when the count hits zero.

When a subset propagates a change, the associated listener simply begins a change and then calls the methods that implement the adding and removing of items of subsets, being careful when removing an item that the source of the change event (corresponding to the removal of the item) is taken to be the subset that the item is being removed from.

In addition to the examples provided above, other classes can also be defined on underlying sets, with such other classes of sets also being able to keep themselves up-to-date whenever the underlying sets change by means of listeners registered with these underlying sets.

Examples of such other classes include: (1) classifiers that retrain themselves whenever their training sets change; (2) count sets that count the number of cases in a bound set that have a particular feature value; (3) n-fold partitions that construct and maintain n pairs of subsets of a bound set, each pair including a randomly drawn subset and the disjoint union of the n−1 other random subsets (validation and training sets, respectively); and (4) statistics objects that keep up-to-date statistics (mean, variance, etc.) on the members of a bound set (or data associated with the members of a bound set). Numerous examples of other classes of sets defined on underlying bound sets can also be defined.

Instructions of various software routines or modules (e.g., software methods and other routines and modules discussed above) are loaded for execution on corresponding processors (e.g., CPU(s) 102 in FIGS. 1A-1B). The processors include microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data and instructions (of the software) are stored in respective storage devices (e.g., storage 104 in FIGS. 1A-1B), which are implemented as one or more machine-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method comprising:
   associating plural change events with corresponding listeners, wherein the plural change events represent distinct groups of one or more changes made to a collection of items;
   in response to a further change of the collection of items, modifying, by a system having a processor, the plural change events to include the further change;
   notifying, by the system, the listeners of the modified change events; and
   associating with the collection an ordered list of registered listeners and a mechanism for indicating that a given listener is up-to-date, wherein the ordered list of registered listeners comprises a first portion including not-up-to-date listeners and a second portion including up-to-date listeners, and wherein associating the collection with the mechanism for indicating that the given listener is up-to-date comprises:
      if a second listener in the ordered list is up-to-date, positioning the given listener in a position following the second listener in the ordered list,
      if no listener in the ordered list is up-to-date, positioning the given listener at an end of the ordered list and noting that the given listener is the first up-to-date listener in the ordered list.

2. The method of claim 1, wherein each of the change events represents changes made to the collection of items between a present time and a later of (1) a time a listener was registered, and (2) a time a listener was last invoked.

3. The method of claim 1, wherein the plural change events comprise at least a first change event and a second change event, and wherein associating the plural change events with the corresponding listeners comprises:
   associating the first change event with a first one of the listeners, the first change event representing a first group of one or more changes to the collection of items having a first content; and
   associating the second change event with a second one of the listeners, the second change event representing a second group of one or more changes to the collection of items having a second, different content.

4. The method of claim 1, further comprising:
   waiting while plural changes represented by a particular one of the change events are being made without calling one of the listeners; and
   notifying the one of the listeners of the plural changes represented by the particular one of the change events by making one call to the one of the listeners.

5. The method of claim 4, wherein waiting while plural changes are being made comprises waiting while nested changes are being made.

6. The method of claim 1, further comprising:
   receiving a first indication that a particular item has been added to the collection;
   creating another change event in response to the first indication;
   associating the another change event with one of the listeners;
   subsequently receiving a second indication that the particular item has been removed from the collection; and
   determining that the one of the listeners not be notified in response to the another change event based on determining from the first and second indications that the addition of the particular item is cancelled by the subsequent removal of the particular item.

7. The method of claim 1, wherein the collection of items comprises a bound collection of items, and wherein associating the plural change events with the corresponding listeners comprises associating the plural change events with the corresponding listeners that are associated with the bound collection.

8. The method of claim 7, further comprising invoking routines of the bound collection to notify listeners of changes made to the bound collection.

9. The method of claim 7, further comprising invoking routines of the bound collection to register listeners with the bound collection.

10. The method of claim 7, further comprising invoking routines of the bound collection to un-register listeners from the bound collection.

11. The method of claim 10, further comprising:
    receiving an indication that a particular listener is to be un-registered from the bound collection, wherein the particular listener is associated with one of the change events;
    un-registering the particular listener from the bound collection by invoking one of the routines, wherein the un-registered listener is not notified of the one change event.

12. The method of claim 10, wherein un-registering listeners from the bound collection comprises un-registering a plurality of listeners registered with the bound collection.

13. The method of claim 1, wherein notifying the listeners of respective modified change events comprises:
    determining that at least one registered listener is not up-to-date;
    indicating that the at least one registered listener is up-to-date;
    making a call to the at least one registered listener passing in the respective change event as a parameter; and
    repeating the determining, the indicating, and the making the call until no registered listener is not up-to-date.

14. The method of claim 13, wherein making the call to the at least one registered listener comprises:
    receiving an indication that an additional change has been made to the collection;
    creating a further change event reflecting the additional change;
    associating the further change event with an up-to-date listener;
    modifying change events associated with not-up-to-date listeners to reflect the additional change;
    indicating that no listener is up-to-date; and
    iteratively notifying the listeners of respective change events.

15. The method of claim 1, wherein associating the ordered list with the collection comprises associating the ordered list with an object associated with the collection.

16. The method of claim 1, further comprising at least one of the listeners indicating that the at least one listener is to be un-registered such that the at least one listener no longer receives notification of change events.

17. The method of claim 1, wherein the collection comprises a first collection, and wherein a first one of the listeners associated with the first collection is registered by a second collection, the method further comprising:

in response to the first listener receiving notification of a change to the first collection, further notifying listeners registered with the second collection of changes to the second collection.

18. The method of claim 17, further comprising determining that the second collection has changed when notified of a change to the first collection based on the second collection being related to the first collection according to a set algebraic relationship, the second collection being one of:
   a union of the first collection and a further collection or collections;
   an intersection of the first collection and a further collection or collections; and
   a difference between the first collection and a further collection.

19. The method of claim 18, further comprising associating routines with the second collection for adding a further collection to or removing a collection from a group of collections, the second collection built from the group of collections using set algebra, wherein changes to contents of any of the collections in the group contribute to changes to contents of the second collection.

20. The method of claim 1, further comprising associating each change event with a first set that contains items added to the collection, and a second set that contains items removed from the collection.

21. A non-transitory machine-readable storage medium storing instructions that when executed cause a system to:
   associate plural change events with corresponding listeners, wherein the plural change events represent distinct groups of one or more changes made to a collection of items;
   in response to a further change of the collection of items, modify the plural change events to include the further change, wherein modifying the plural change events comprises changing content of each of the plural change events such that the content of each of the plural change events is changed to contain information reflecting the further change;
   notify the listeners of respective plural change events;
   associate with the collection an ordered list of registered listeners and a mechanism for indicating that a given listener is up-to-date, wherein the ordered list of registered listeners comprises a first portion including not-up-to-date listeners and a second portion including up-to-date listeners, and wherein associating the collection with the mechanism for indicating that the given listener is up-to-date comprises:
      if a second listener in the ordered list is up-to-date, positioning the given listener in a position following the second listener in the ordered list,
      if no listener in the ordered list is up-to-date, positioning the given listener at an end of the ordered list and noting that the given listener is the first up-to-date listener in the ordered list.

22. The machine-readable storage medium of claim 21, wherein the plural change events comprise at least a first change event and a second change event, and wherein associating the plural change events with the corresponding listeners comprises:
   associating the first change event with a first one of the listeners, the first change event representing a first group of one or more changes to the collection of items having a first content; and
   associating the second change event with a second one of the listeners, the second change event representing a second group of one or more changes to the collection of items having a second, different content.

23. The machine-readable storage medium of claim 21, wherein the instructions when executed cause the system to further:
   receive a first indication that a particular item has been added to the collection;
   create another change event in response to the first indication;
   associate the another change event with one of the listeners;
   subsequently receive a second indication that the particular item has been removed from the collection; and
   determine that the one of the listeners is not to be notified in response to the another change event based on determining from the first and second indications that the addition of the particular item is cancelled by the subsequent removal of the particular item.

24. The machine-readable storage medium of claim 21, wherein the instructions when executed cause the system to further:
   associate another listener with a second collection that is an algebraic collection built from further collections according to set algebra; and
   notifying the another listener of a change to the second collection in response to a change to any of the further collections.

* * * * *